(12) United States Patent
Chu et al.

(10) Patent No.: US 11,396,899 B2
(45) Date of Patent: Jul. 26, 2022

(54) BOLT CLAMPING FORCE SENSING WASHER

(71) Applicant: CHINA PNEUMATIC CORPORATION, Taoyuan (TW)

(72) Inventors: Hsiu-Feng Chu, Taoyuan (TW); Yu-Wei Chu, Taoyuan (TW)

(73) Assignee: CHINA PNEUMATIC CORPORATION, Taoyuan (TW)

( * ) Notice: Subject to any disclaimer, the term of this patent is extended or adjusted under 35 U.S.C. 154(b) by 329 days.

(21) Appl. No.: 15/931,618

(22) Filed: May 14, 2020

(65) Prior Publication Data
US 2021/0355981 A1  Nov. 18, 2021

(51) Int. Cl.
| F16B 31/02 | (2006.01) |
| G01L 5/24 | (2006.01) |
| B25B 23/145 | (2006.01) |
| B25B 23/147 | (2006.01) |

(52) U.S. Cl.
CPC ............ *F16B 31/028* (2013.01); *G01L 5/243* (2013.01); *B25B 23/1453* (2013.01); *B25B 23/1456* (2013.01); *B25B 23/1475* (2013.01)

(58) Field of Classification Search
None
See application file for complete search history.

(56) References Cited

FOREIGN PATENT DOCUMENTS

JP      2020193825 A   * 12/2020

* cited by examiner

*Primary Examiner* — Adolf Dsouza

(57) ABSTRACT

A bolt clamping force sensing washer includes a sensing washer, connection line assembly, and signal processor. The sensing washer includes a body, sensing component, and bushing. The body has an axial hole that matches outer diameter of a bolt's thread. The circumferential surface of the body has a circumferential groove for receiving the sensing component which measures a deformation signal generated by the body under an axial load. Two end surfaces of the body are perpendicular to the axial hole and each have a loosening-proof structure. The bushing is made of metal or plastic or formed by plastic insulating material casting to enclose the sensing component. The signal processor has a signal amplifier, microprocessor, pairing switch, power circuit unit, signal transmission unit, memory unit, RF antenna and alert unit. The connection line assembly is disposed at the bushing to electrically connect the sensing component and signal processor.

10 Claims, 21 Drawing Sheets

BOLT CLAMPING FORCE SENSING WASHER

BACKGROUND OF THE INVENTION

1. Field of the Invention

The present disclosure relates to bolt clamping force sensing washers, and in particular to a bolt clamping force sensing washer capable of loosening-proofing and monitoring the tightness condition of a bolted joint.

2. Description of the Related Art

Uniform clamping force is crucial to bolting works. Odds are that the bolted joint might loosen because of vibration and cause serious industrial accidents and damage.

Ultrasonic-operated bolt tension gauges are currently the most precise tools for use in high-precision control of bolt clamping force. However, ultrasonic-operated bolt tension gauges incur high manufacturing cost and high operation cost and thus hardly gain popularity. On the other hand, conventional sensing bolts each having therein an axially-embedded deformable sensing component for sensing the clamping force on the bolted joint are limited by high prices and can only be operated by open-end wrenches and thus are difficult to operate, inefficient, and unpopular. Control and detection of the bolt clamping force can also be achieved with an axial force sensing device, such as a piezoelectric sensing ring, a bolt transducer, or a center-hole type compression load cell. In practice, all the foregoing solutions pose a loosening issue because of vibration and tampering, regardless of manufacturing cost, ease of use, and control precision. Therefore, whatever precise control over torques or clamping forces is useless in the absence of loosening-proofing design and remote tightness monitoring mechanism which are required to report failures or abnormal condition.

Although the bolt transducer and the center-hole type compression load cell monitor variations in a bolt clamping force, they have a drawback described below. Both the bolt transducer and the center-hole type compression load cell are similar to the loosening-proof washer in terms of surface hardness. After a bolt has been tightened, the serrated ribs of the loosening-proof washer cannot be embedded under the end surfaces of the bolt transducer and center-hole type compression load cell and thus cannot prevent the bolt from loosening.

BRIEF SUMMARY OF THE INVENTION

An objective of the present disclosure is to provide a bolt clamping force sensing washer capable of loosening-proofing and monitoring the tightness condition of a bolted joint. The bolt clamping force sensing washer of the present disclosure overcomes the drawbacks of the prior art, augments industrial applicability, and paves the way for wide application toward industry 4.0. The bolt clamping force sensing washer of the present disclosure enables the operator to control the clamping force during the bolting process, prevents the bolted joint from loosening because of vibration, and monitors continuously in a wired or wireless manner whether the bolted joint has loosened because of vibration or tampering, so as to ensure structural security, track and check workplace records and responsibilities.

To achieve at least the above objective, the present disclosure provides a bolt clamping force sensing washer, comprising: a sensing washer having a body, a sensing component, and a bushing, the body being made of metal and having an axial hole, the axial hole matching an outer diameter of the thread of a bolt and being coaxial with the body, wherein two end surfaces of the body are perpendicular to the axial hole and each have a loosening-proof structure, wherein a circumferential surface of the body has a concave circumferential groove for receiving the sensing component adhered to the bottom of the groove for sensing a deformation signal generated by the body under an axial load, wherein the bushing is made of metal or plastic or formed by an insulating elastomer material casting to enclose the sensing component; a signal processor having a signal amplifier, a microprocessor, a pairing switch, a power circuit unit, a signal transmission unit, a memory unit, an RF antenna and an alert unit; and a connection line assembly disposed at the bushing to electrically connect the sensing component and the signal processor.

In an embodiment, the loosening-proof structures on both ends of the body are two radial rib surfaces, two wedge cam surfaces, or one said radial rib surface and one said wedge cam surface.

In an embodiment, the loosening-proof structures on the two end surfaces of the body are radial rib surfaces, wherein gradient of arcuate cross sections of the radial rib surfaces is greater than lead angle of the bolt and irrelevant to helical direction of the bolt.

In an embodiment, the loosening-proof structures on the two end surfaces of the body are wedge cam surfaces, wherein inclination angle of the wedge cams on the wedge cam surfaces is greater than the lead angle of the bolt, and inclination direction of the wedge cams is identical to helical direction of the bolt.

In an embodiment, the loosening-proof structures on the two end surfaces of the body are wedge cam surfaces meshing with wedge cam surfaces of the loosening-proof washer.

In an embodiment, inclination angle of cross sections of serrated ribs on serrated rib surfaces on rear surfaces of the wedge cam surfaces of the loosening-proof washer is greater than lead angle of the bolt, and inclination direction of cross sections of the serrated ribs is opposite to the helical direction of the bolt.

In an embodiment, the body is of the same hardness as the loosening-proof washer, wherein the body and the loosening-proof washer are of higher hardness than a bolt head of the bolt and the surface of an element to be bolted.

In an embodiment, the sensing component is a resistive strain gauge or pressure sensing component for measuring the deformation signal generated under the axial load.

In an embodiment, the signal processor transmits the deformation signal to a controller of a torque tool wirelessly to control the clamping force of the bolt and uploads data of the deformation signal to a monitoring device through a gateway wiredly or wirelessly, wherein the monitoring device sends an alert when the deformation signal exceeds a predetermined level.

Therefore, the bolt clamping force sensing washer of the present disclosure is capable of loosening-proofing and monitoring the tightness condition of a bolted joint.

DETAILED DESCRIPTION OF THE INVENTION

Figure 1:
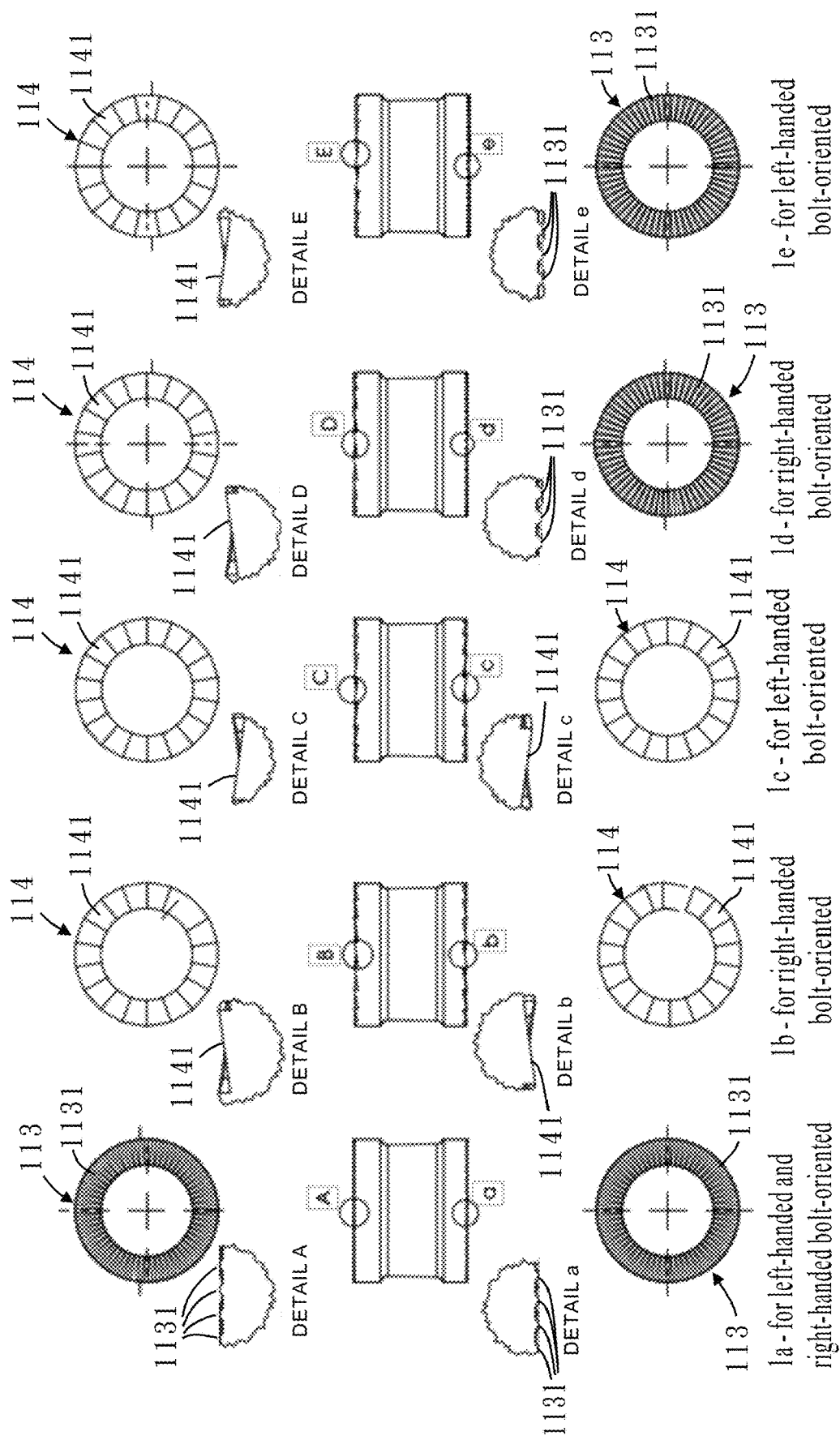
FIG. 1 is a schematic view of different loosening-proof structures of a bolt clamping force sensing washer according to an embodiment of the present disclosure.
Figure 2A:
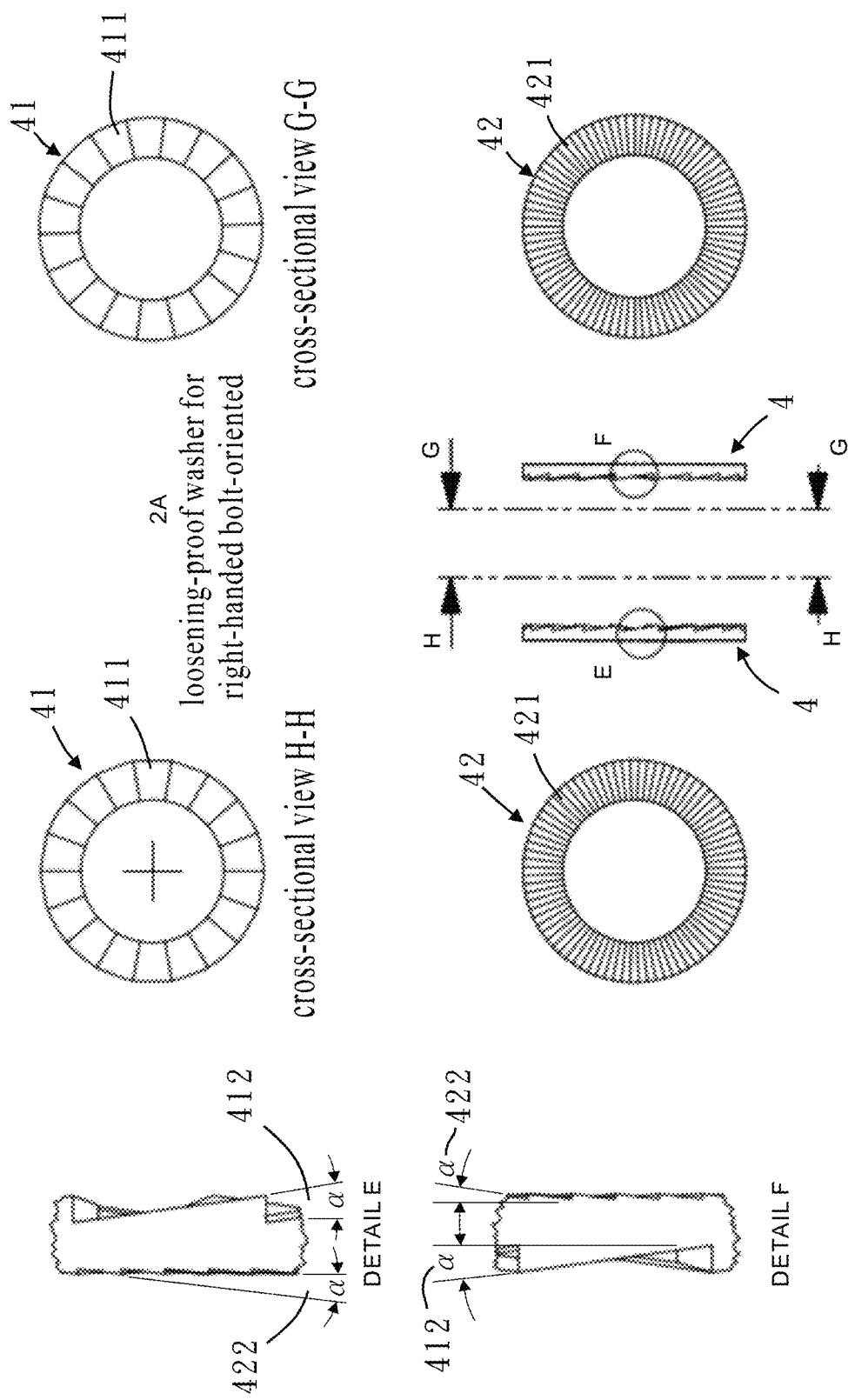
FIG. 2A is a schematic view of a bolt clamping force sensing washer operating in conjunction with a right-handed bolt-oriented loosening-proof washer according to an embodiment of the present disclosure.
Figure 2B:
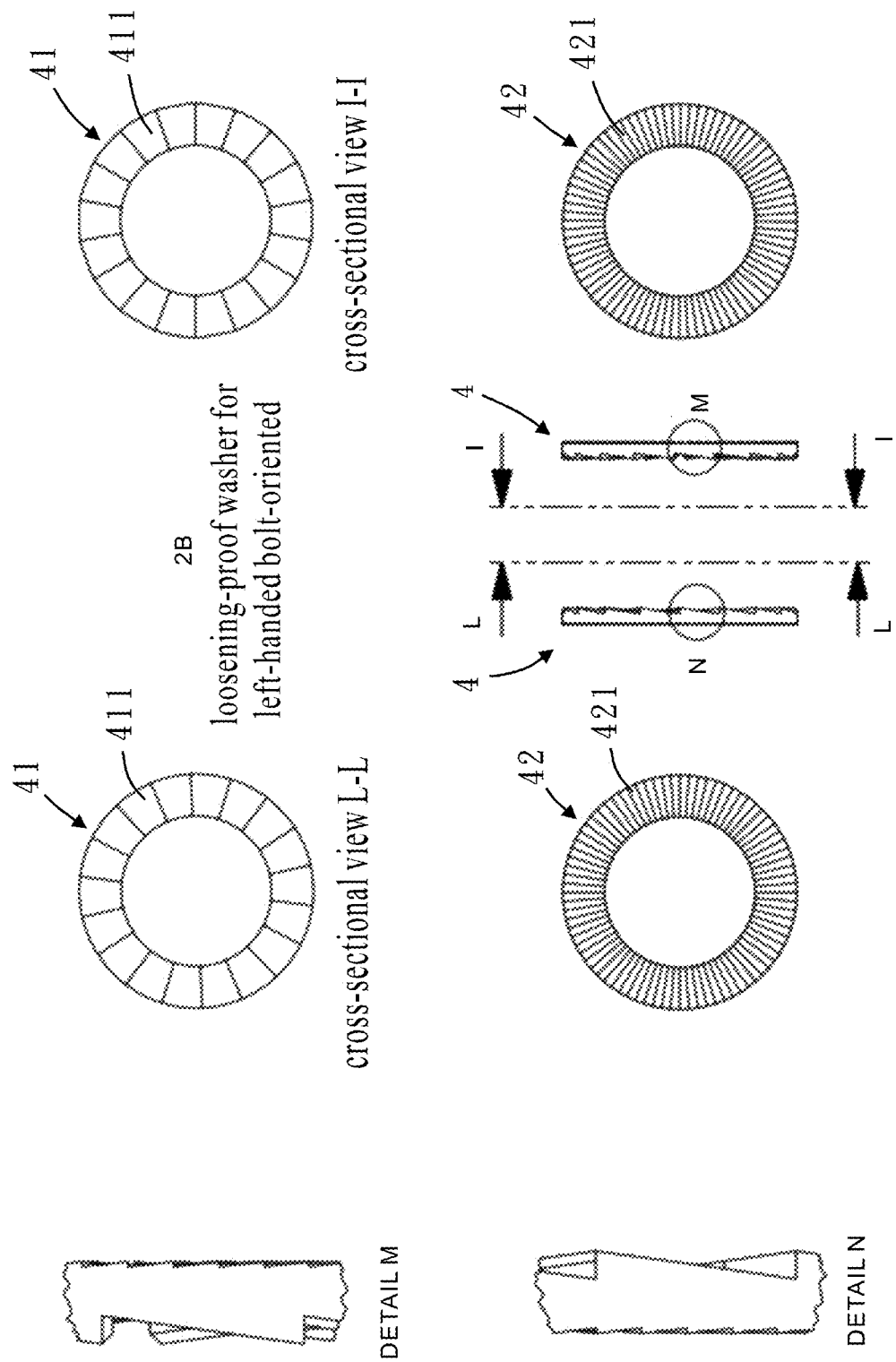
FIG. 2B is a schematic view of the bolt clamping force sensing washer operating in conjunction with a left-handed bolt-oriented loosening-proof washer according to an embodiment of the present disclosure.
Figure 3:
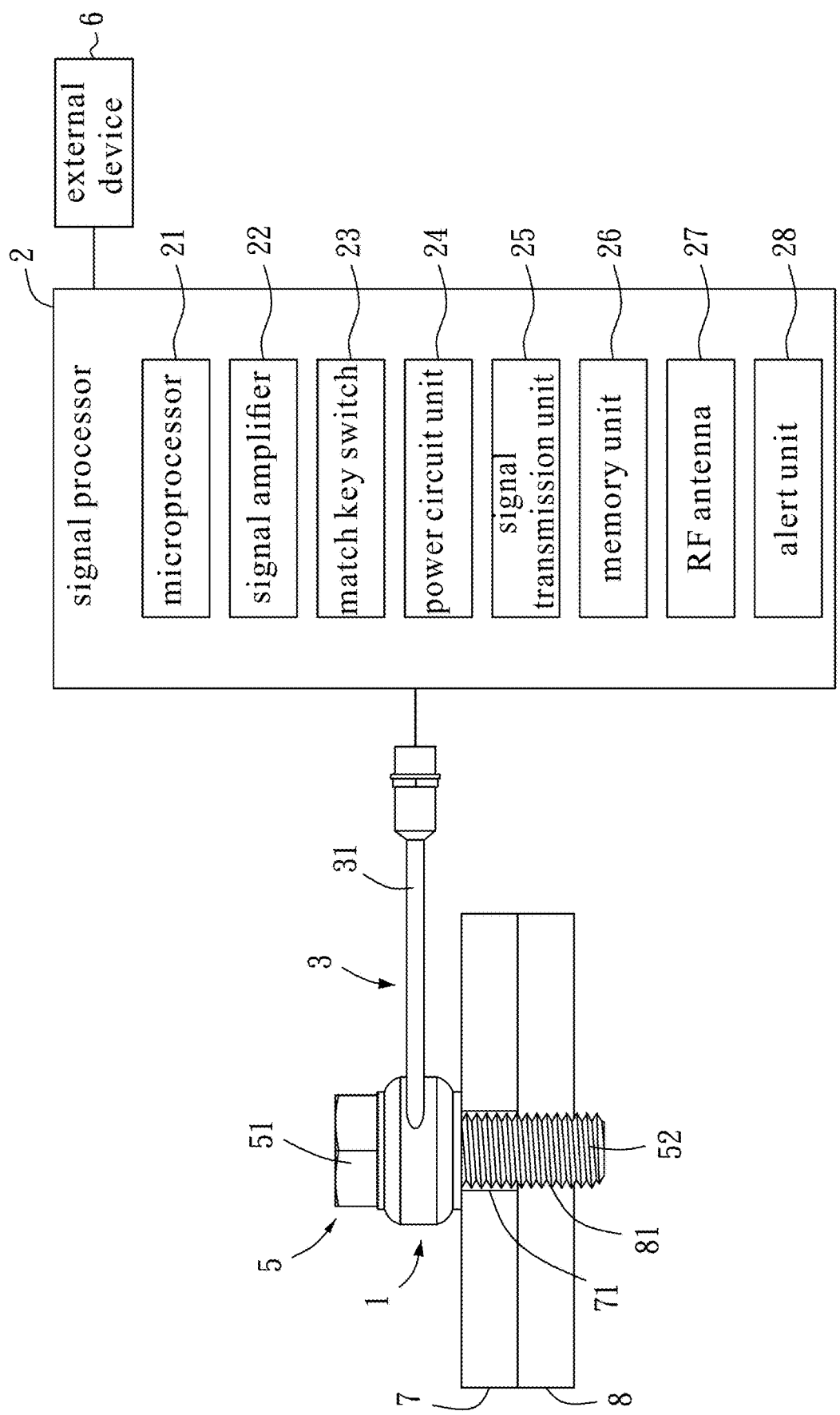
FIG. 3 is a schematic view of the bolt clamping force sensing washer and a right-handed bolt according to an embodiment of the present disclosure.
Figure 4:
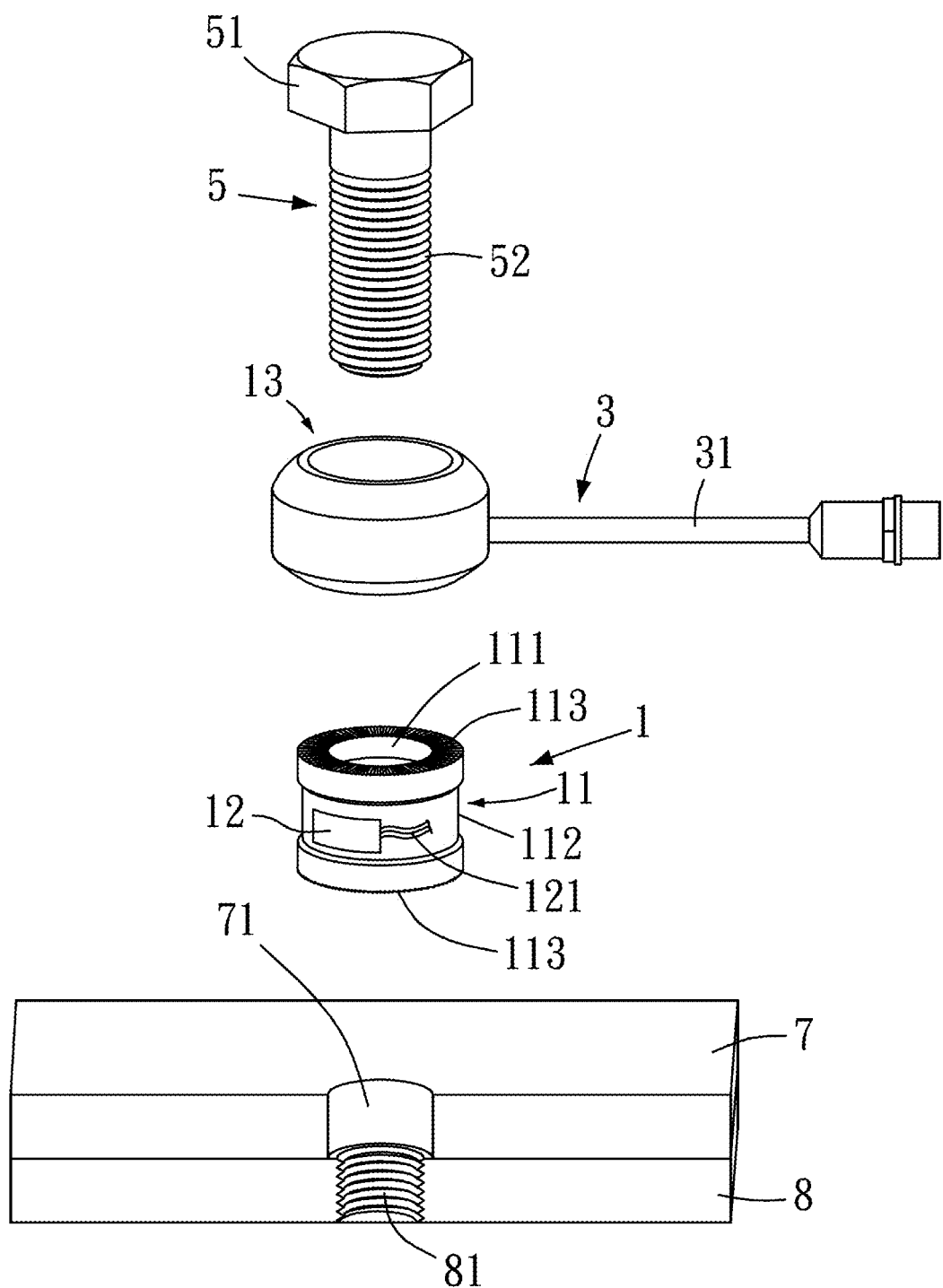
FIG. 4 is an exploded view of the bolt clamping force sensing washer shown in FIG. 3 and a left- or right-handed bolt.
Figure 5:
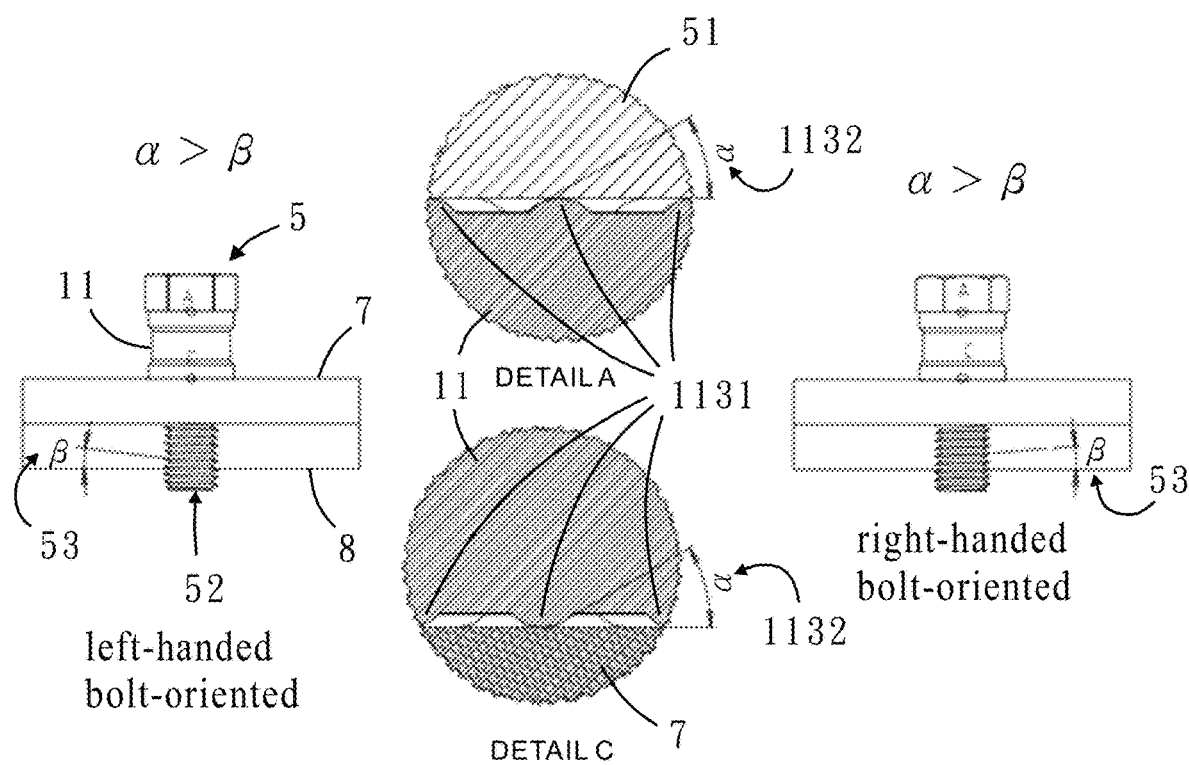
FIG. 5 is a cross-sectional view of the loosening-proof structure of a body applicable to the left and right handed bolts shown in FIG. 3.
Figure 6:
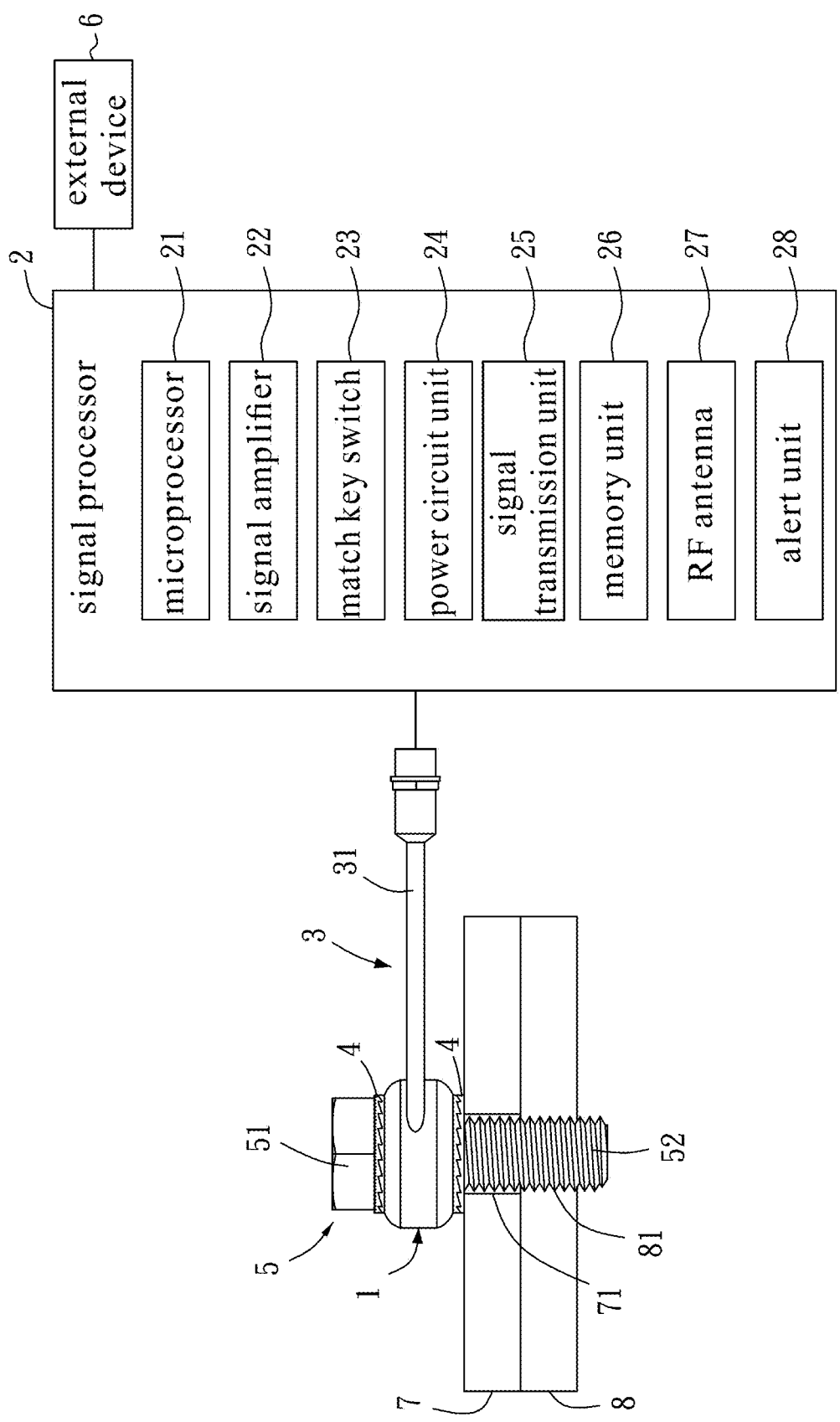
FIG. 6 is a schematic view of the bolt clamping force sensing washer and the right-handed bolt according to an embodiment of the present disclosure.
Figure 7:
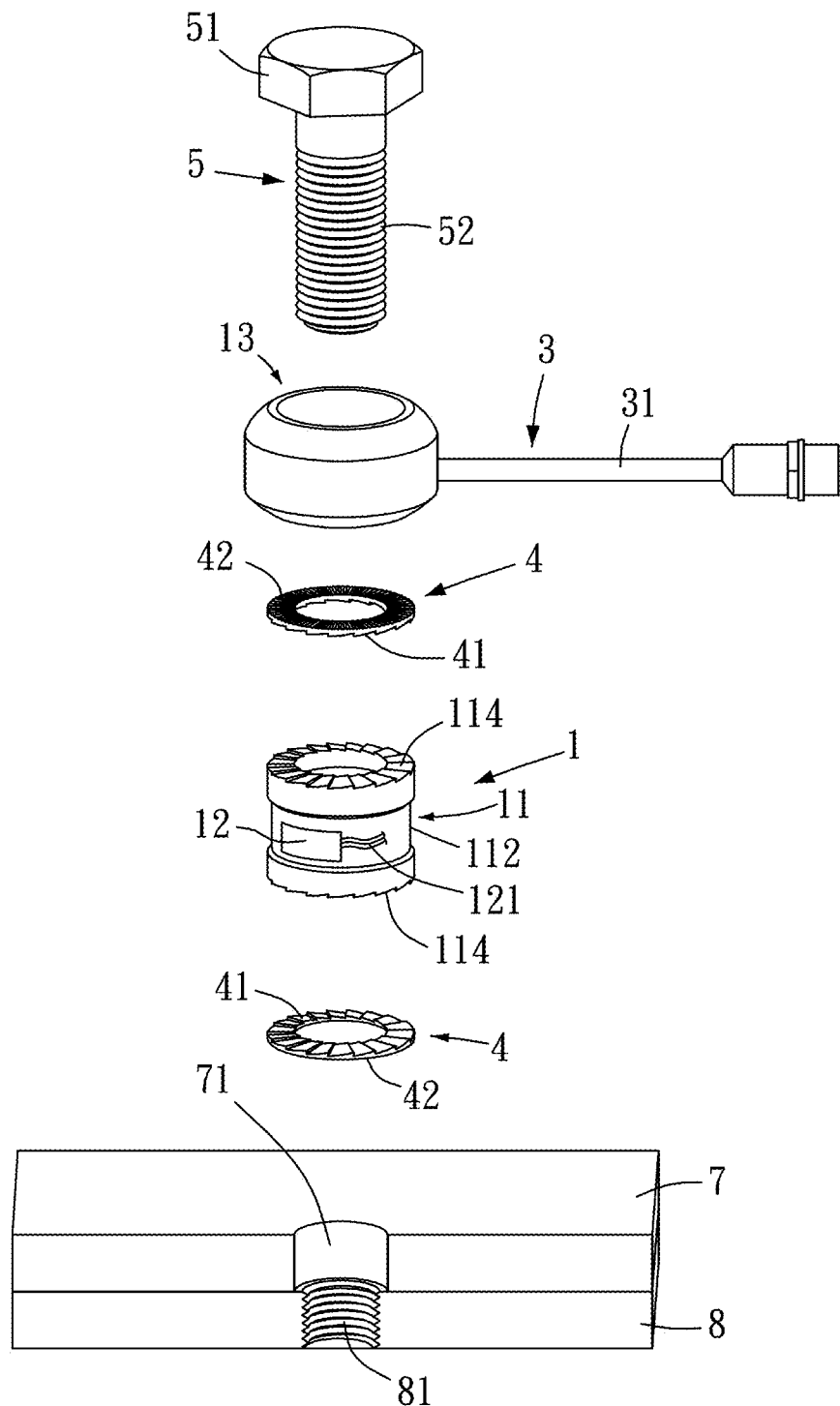
FIG. 7 is an exploded view of the bolt clamping force sensing washer shown in FIG. 6 and applied to the right-handed bolt.
Figure 8:
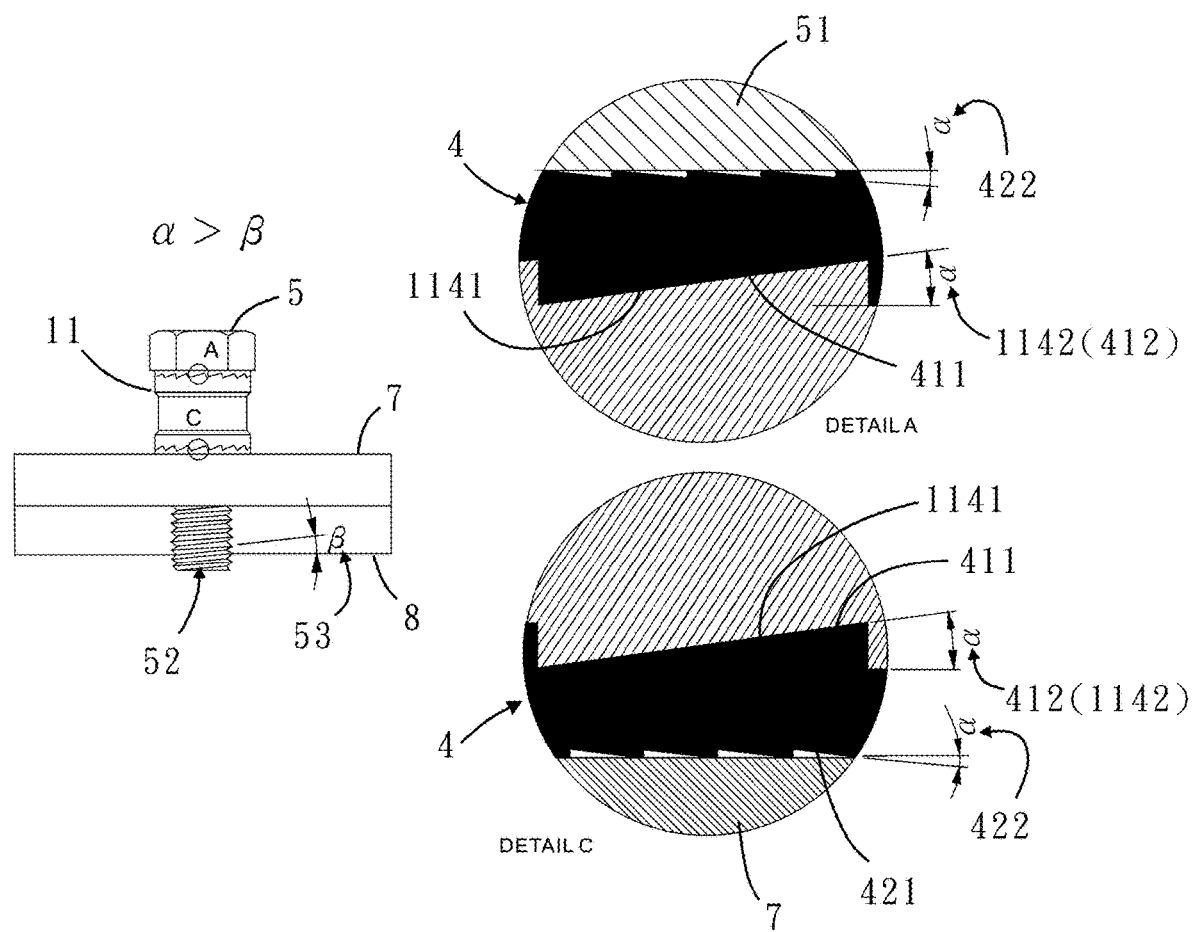
FIG. 8 is a cross-sectional view of the loosening-proof structure of the sensing washer shown in FIG. 6 and applied to the right-handed bolt.
Figure 9:
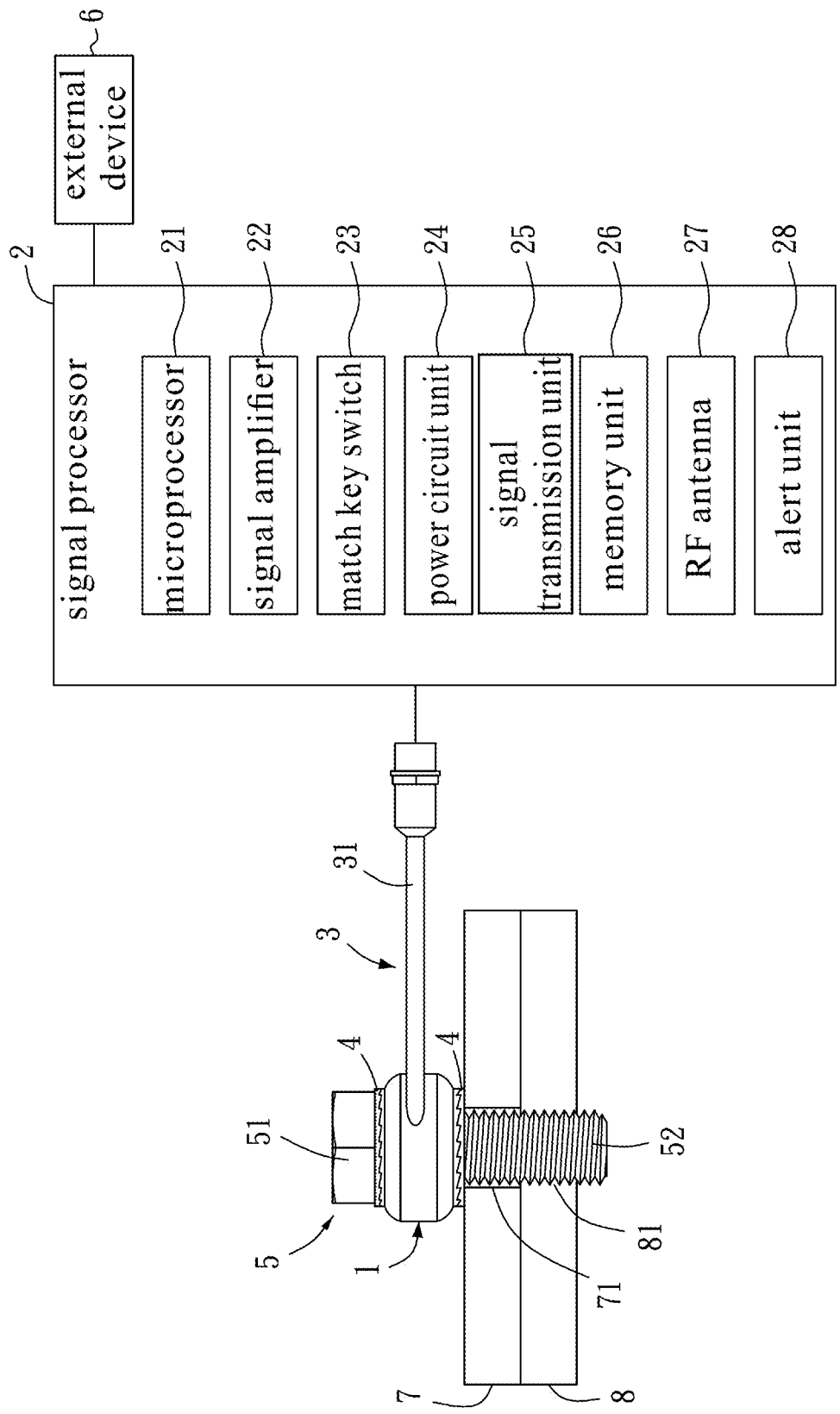
FIG. 9 is a schematic view of the bolt clamping force sensing washer and the left-handed bolt according to an embodiment of the present disclosure.
Figure 10:
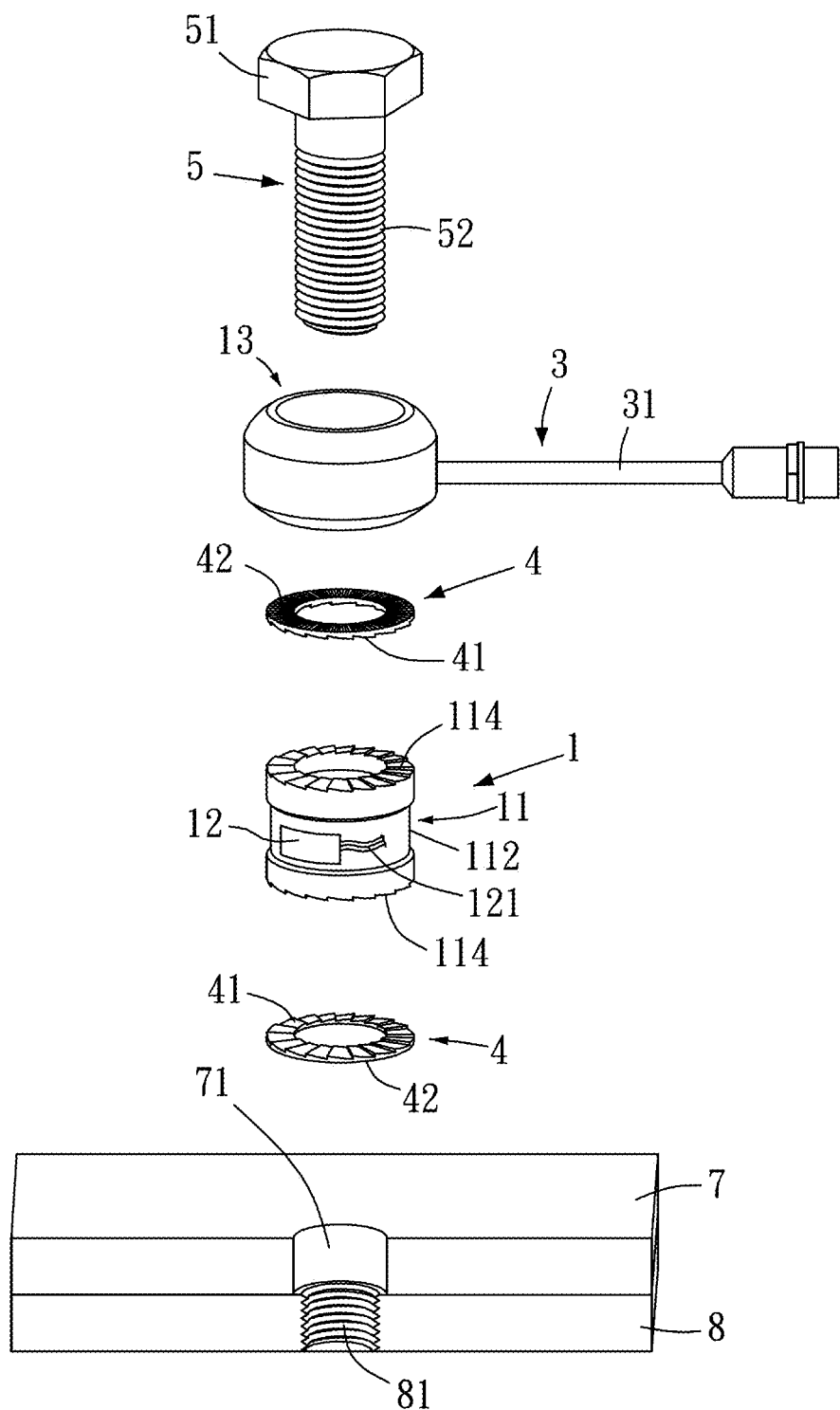
FIG. 10 is an exploded view of the bolt clamping force sensing washer shown in FIG. 9 and applied to the left-handed bolt.
Figure 11:
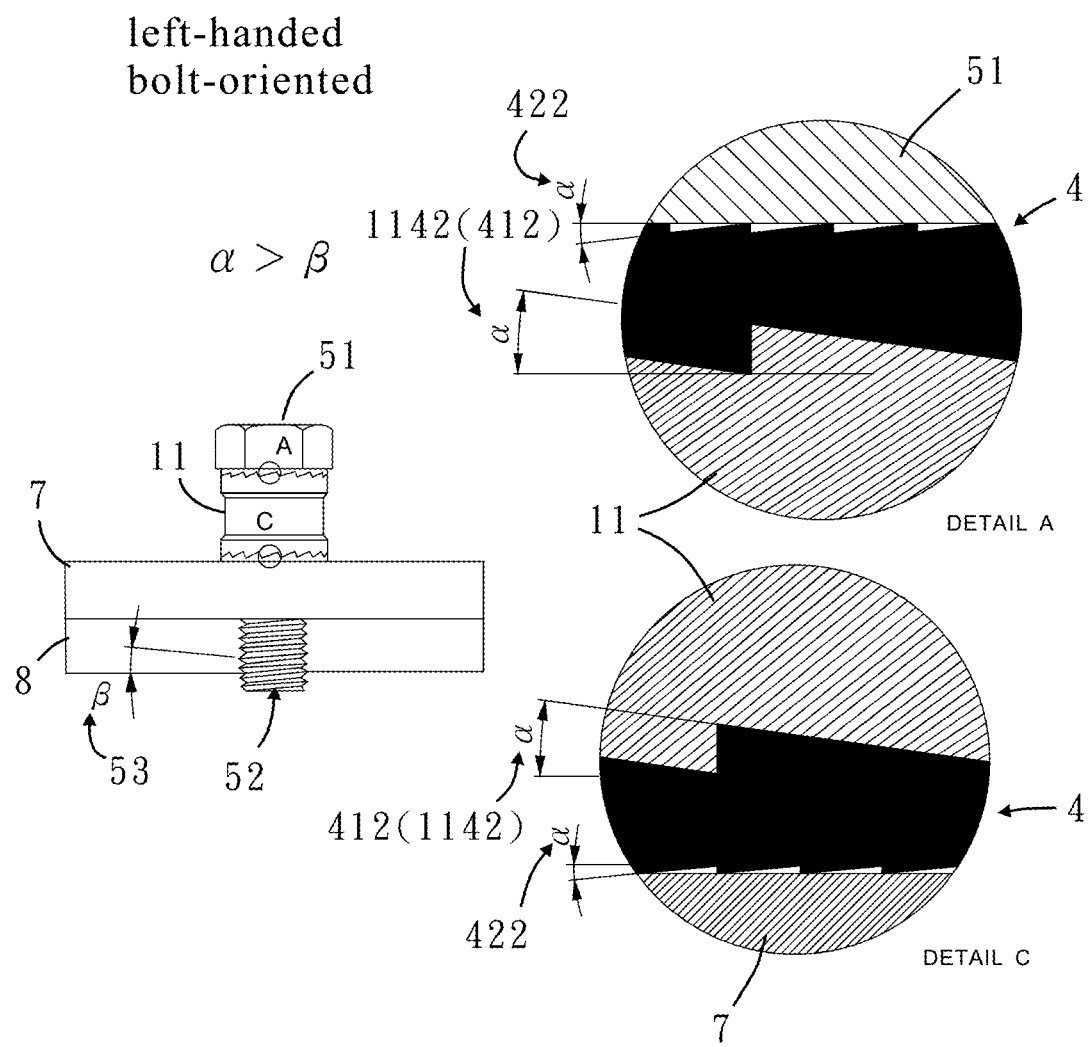
FIG. 11 is a cross-sectional view of the loosening-proof structure of the sensing washer shown in FIG. 9 and applied to the left-handed bolt.
Figure 12:
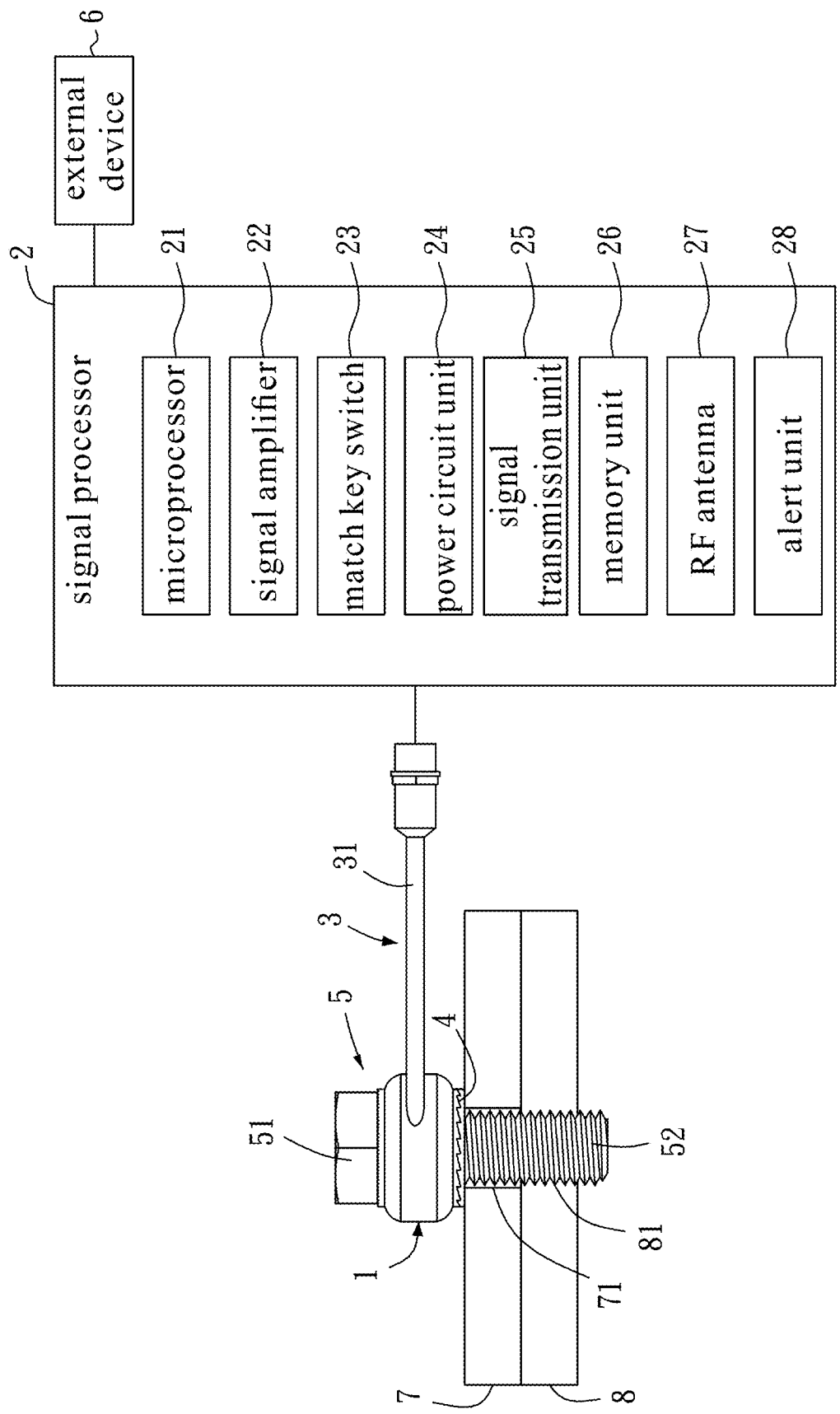
FIG. 12 is another schematic view of the bolt clamping force sensing washer and the right-handed bolt according to an embodiment of the present disclosure.
Figure 13:
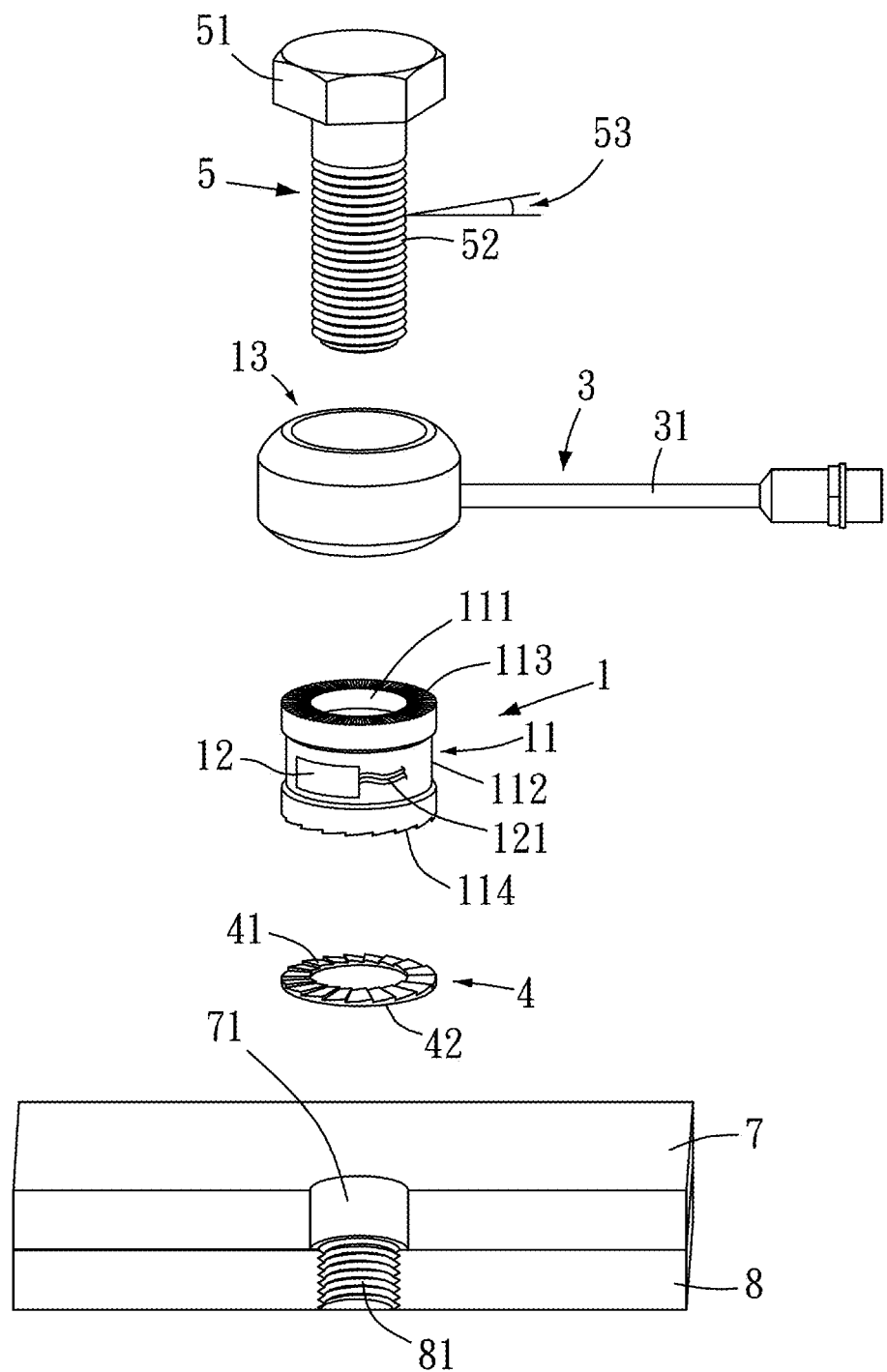
FIG. 13 is another exploded view of the bolt clamping force sensing washer and the right-handed bolt shown in FIG. 12.
Figure 14:
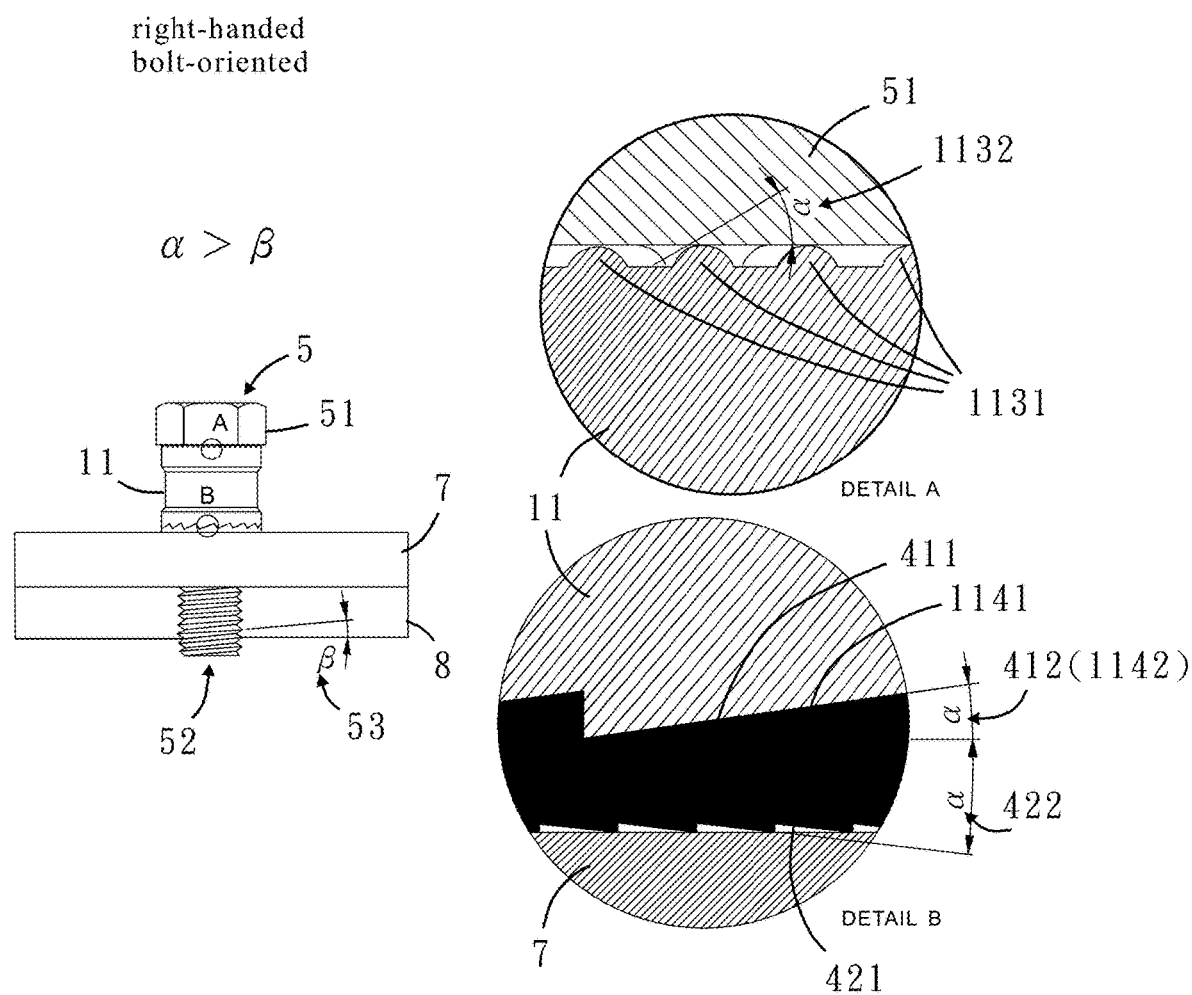
FIG. 14 is a cross-sectional view of another loosening-proof structure of the sensing washer and the right-handed bolt shown in FIG. 12.
Figure 15:
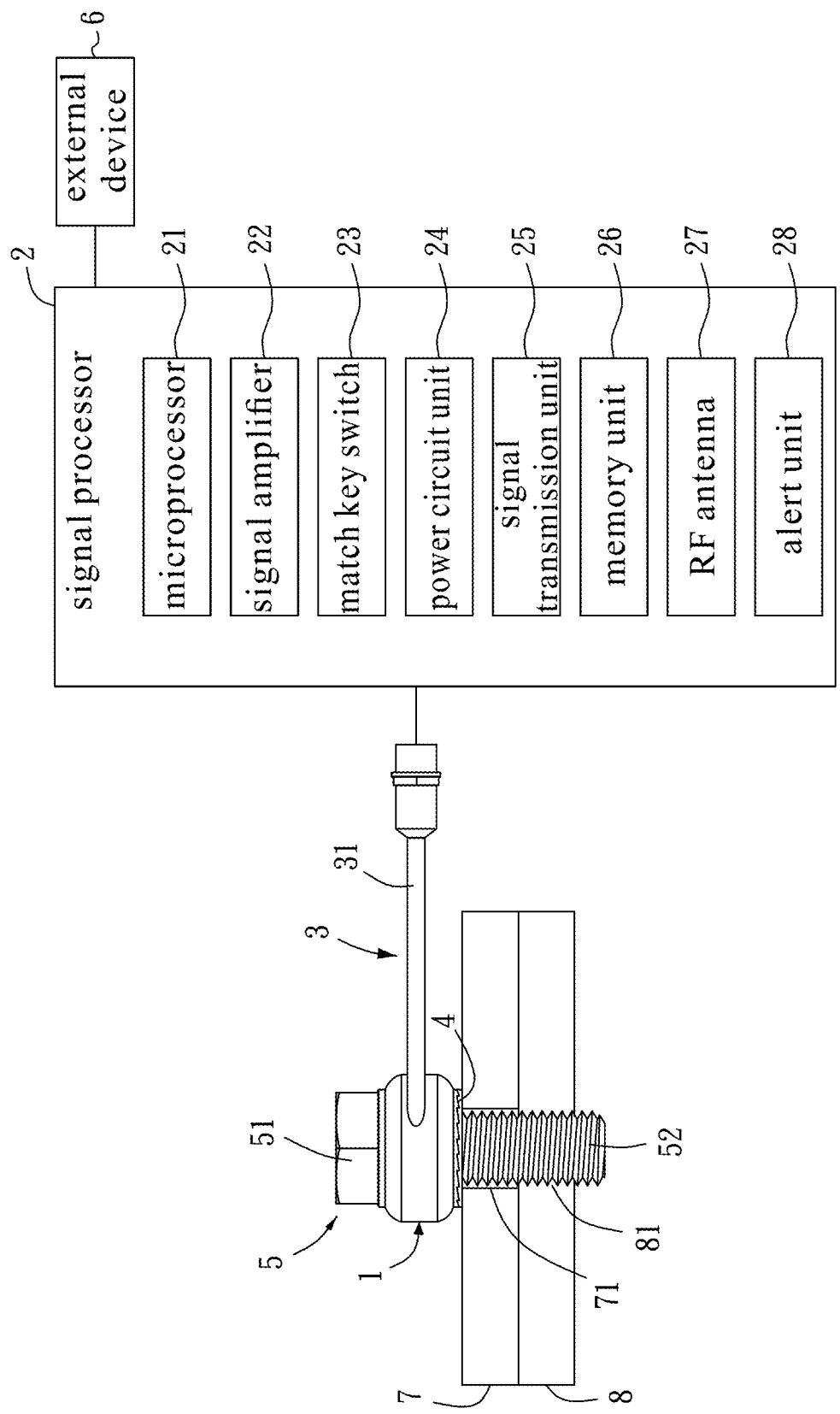
FIG. 15 is another schematic view of the bolt clamping force sensing washer and the left-handed bolt according to an embodiment of the present disclosure.

To facilitate understanding of the object, characteristics and effects of this present disclosure, embodiments together with the attached drawings for the detailed description of the present disclosure are provided.

Referring to FIG. 1, FIG. 2A, FIG. 2B, FIG. 5, FIG. 8, FIG. 11, FIG. 14 and FIG. 17, the present disclosure provides a body 11 of a bolt clamping force sensing washer and a loosening-proof structure thereof. The body 11 is made of metal and has an axial hole 111. The body 11 and the axial hole 111 are coaxial. Two end surfaces of the body 11 are perpendicular to the axial hole 111. Referring to diagrams 1a of FIG. 1, the two end surfaces are radial rib surfaces 113. Referring to diagrams 1b, 1c of FIG. 1, the two end surfaces are wedge cam surfaces 114. Referring to diagrams 1d, 1e of FIG. 1, the two end surfaces are the wedge cam surface 114 and radial rib surface 113, respectively. Referring to diagrams 1a of FIG. 1, gradient 1132 of radial ribs 1131 of the radial rib surface 113 is greater than lead angle 53 of the bolt 5. Referring to diagrams 1a of FIG. 1, the loosening-proof structure is applicable to the left-handed or right-handed bolt. Referring to diagrams 1b, 1c of FIG. 1, an inclination angle 1142 of the wedge cams 1141 of the wedge cam surface 114 is greater than the lead angle 53 of the bolt 5 to prevent, by tension rather than friction, the bolt 5 from loosening. Referring to diagrams 1b, 1c of FIG. 1, the loosening-proof structures operate in conjunction with the loosening-proof washer 4 of FIG. 2A and FIG. 2B. Referring to diagrams 1d, 1e of FIG. 1, the loosening-proof structures are one radial rib surface 113 and one wedge cam surface 114 to operate in conjunction with one of the loosening-proof washers 4 of FIG. 2A and FIG. 2B. The wedge cam surfaces 114 of the body 11 of diagrams 1b, 1c, 1d and 1e of FIG. 1 correspond in dimensions and hardness to the wedge cam surfaces 41 of the loosening-proof washers 4 and are of higher hardness than the bolt 5 and the surface of a fixed element 7. The inclination angle 1142 of the wedge cams 1141 of the body 11 is identical to the helical direction of the bolt 5. An inclination angle 422 of serrated ribs 421 on serrated rib surfaces 42 on rear surfaces of wedge cam surfaces 41 of the loosening-proof washer 4 is equal in magnitude to but opposite in inclination direction to the inclination angle 412 of the wedge cam 411 on another end surface of the loosening-proof washer 4.

Referring to FIG. 3, FIG. 4, FIG. 5 and FIG. 22, the present disclosure provides a bolt clamping force sensing washer which comprises a sensing washer 1, a signal processor 2 and a connection line assembly 3. The sensing washer 1 has the body 11, a sensing component 12, and a bushing 13. The body 11 has an axial hole 111 which matches the outer diameter of a thread 52 of the bolt 5; thus, the axial hole 111 and the body 11 are coaxial. The circumferential surface of the body 11 has a concave circumferential groove 112. Two end surfaces of the body 11 are perpendicular to the axial hole 111 and each have a loosening-proof structure. The loosening-proof structures are radial rib surfaces 113. The sensing component 12 is embedded in the circumferential groove 112 and adapted to sense deformation signal arising from a clamping force generated when the body 11 is tightened by the bolt 5. The bushing 13 is made of metal or plastic or formed by plastic insulating material casting to enclose and protect the sensing component 12. The signal processor 2 has a microprocessor 21, signal amplifier 22, pairing switch 23, power circuit unit 24 (outlet electricity or battery), signal transmission unit 25

Figure 16:
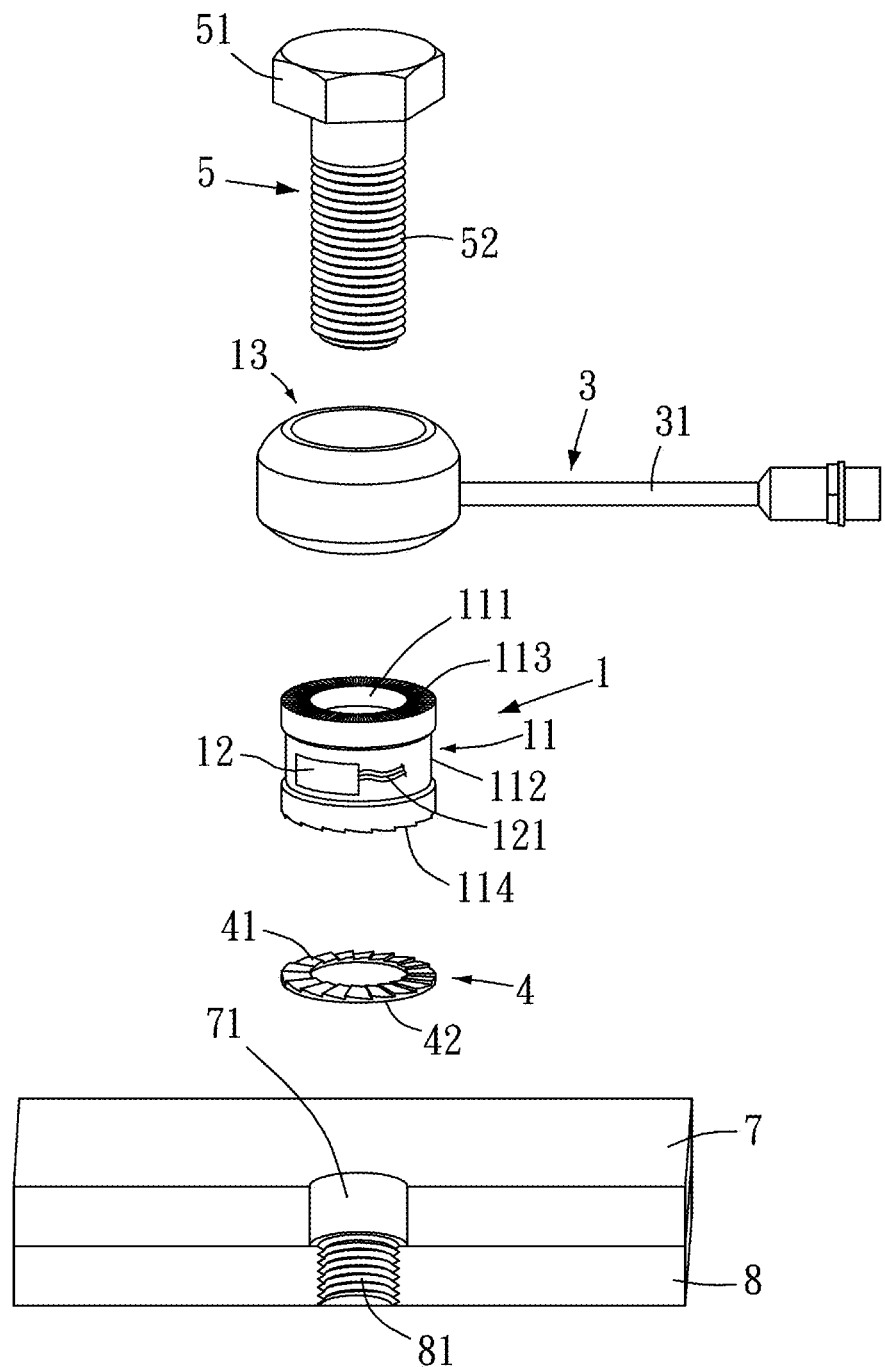
FIG. 16 is another exploded view of the bolt clamping force sensing washer and the left-handed bolt shown in FIG. 15.
Figure 17:
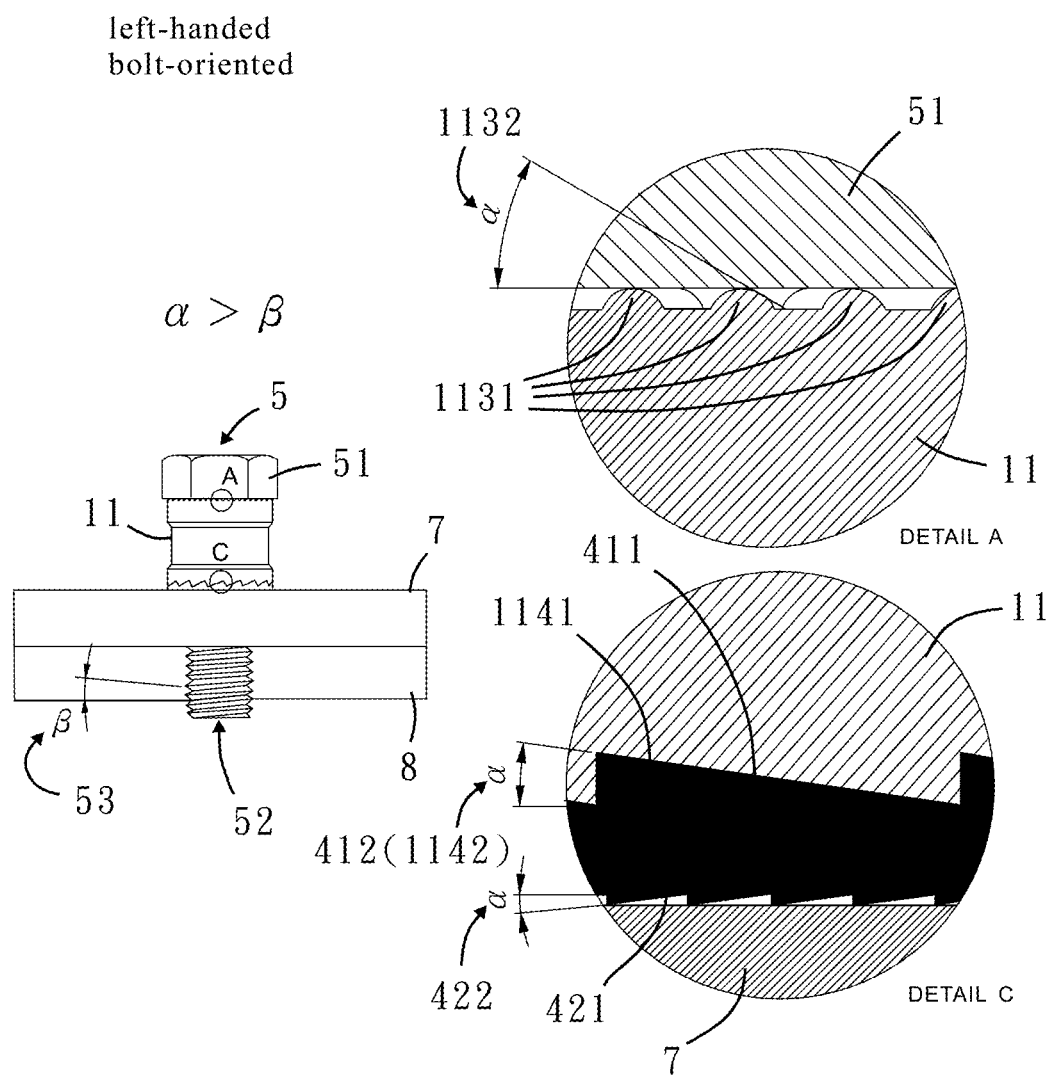
FIG. 17 is a cross-sectional view of another loosening-proof structure of the sensing washer and the left-handed bolt shown in FIG. 15.

(transmission interface card), memory unit 26 (memory or memory card), RF antenna 27 (or Bluetooth) and alert unit 28 (buzzer or alert lamp). The signal amplifier 22, the pairing switch 23, the power circuit unit 24, the signal transmission unit 25, the memory unit 26, the RF antenna 27 and the alert unit 28 are electrically connected to the microprocessor 21. The pairing switch 23 is replaced by an RF label for recognition. The signal processor 2 is capable of achieving displaying, match recognition, positioning and lightning protection outdoors to send, according to predetermined parameters, the position of the bolt 5 and the state of the clamping force to a cloud server 92 (as shown in FIG. 16), so as to perform remote monitoring and control, or send alerts as soon as variation in the clamping force of the bolt 5 falls outside a predetermined range. The sensing washer 1 is calibrated to figure out the relation between the magnitude of its axial load and the resultant deformation signal and store it in the memory unit 26 of the signal processor 2. The connection line assembly 3 penetrates the bushing 13 so as to electrically connect the sensing component 12 and the signal processor 2.

Figure 22:
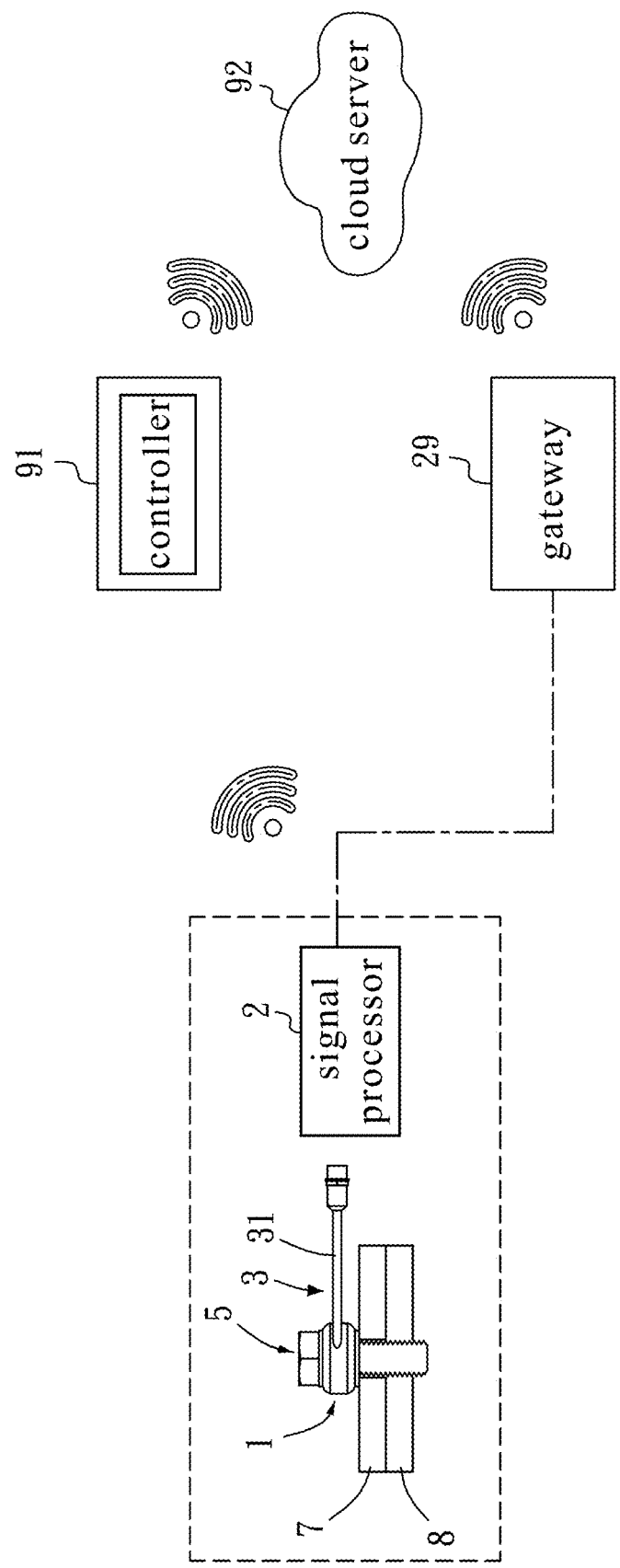
FIG. 22 is a schematic view of application of the bolt clamping force sensing washer according to an embodiment of the present disclosure.

When the bolt 5 penetrates the axial hole 111 of the body 11 of the sensing washer 1, a through hole 71 of the fixed element 7, and a screw tapped hole 81 of a fastened element 8 to perform a bolting process, the signal transmission unit 25 of the signal processor 2 receives the deformation signal from the sensing washer 1, whereas the microprocessor 21 of the signal processor 2 performs computation continuously to figure out variations in the clamping force and sends the variations synchronously, wirelessly (such as by RF antenna) to a controller 91 (the controller is pneumatically, electrically or hydraulically operated and adapted to effect torque-based clamping). As soon as the bolt 5 attains the target level of the clamping force predetermined by the controller 91, the controller 91 cuts off power supply and informs workers with sound or lamp signs. Upon completion of the bolting process, the radial ribs 1131 (shown in FIG. 5) on the radial rib surfaces 113 on the two end surfaces of the sensing washer 1 are embedded in the bottom of a bolt head 51 of the bolt 5 and the surface of the fixed element 7, respectively; consequently, the loosening-proof structures on the two end surfaces of the sensing washer 1 prevent the vibration-induced loosening of the bolt 5. The two end surfaces of the sensing washer 1 have the radial rib surfaces 113, respectively. The bolt 5 is a right-handed or left-handed bolt. As shown in FIG. 22, through the signal processor 2, the sensing washer 1 is wiredly (for example, by RS485) or wirelessly (for example, by RF antenna) electrically connected to a gateway 29 and a monitoring device (such as the cloud server 92) located peripherally to effect remote monitoring and control. The gateway 29 is equipped with a positioning device (such as GPS) or lightning protection device, as needed, for outdoor use. The position of the bolt 5 and the state of the clamping force are sent according to a predetermined parameter to the cloud server 92 for remote monitoring and control. When variation in the clamping force of the bolt 5 falls outside a predetermined range, the alert unit 28 of the signal processor 2 or the controller 91 give an alert immediately. The signal processors 2 are electrically connected to the same gateway 29 and then to a peripheral, such as the controller 91 or the cloud server 92. Access to the signal processor 2 and access to the sensing washer 1 are independent of each other; however, a calibration-related parameter component, for example, RF label, 1D or 2D barcode, or delivery serial number of the sensing washer 1, adapted to recognize or read the sensing washer 1 is attached to an appropriate point on the bushing 13 or the end surface of the body 11 of the sensing washer 1; consequently, when the sensing washer 1 is electrically connected to the signal processor 2, the calibration parameter of the sensing washer 1 is obtained and used in computing the clamping force level and performing a related process, for example, memory, transmission, and monitoring. Therefore, the bolt clamping force sensing washer of the present disclosure evaluates the variations in the clamping force generated in the course of clamping the bolt 5, monitors the tightness of the fastened bolt continuously, prevents vibration-induced loosening, and gives alerts in the event of tampering, so as to ensure everlasting structural safety. Furthermore, operation-related data stored in the memory unit 26 of the signal processor 2 enables the tracking and checking of related bolting job responsibilities.

Referring to FIG. 1, FIG. 2A, FIG. 2B, FIG. 6, FIG. 7, FIG. 8, FIG. 9, FIG. 10 and FIG. 11, in this embodiment, the loosening-proof structures on the two end surfaces (perpendicular to the axial hole 111) of the body 11 of the sensing washer 1 are wedge cam surfaces 114. The wedge cam surfaces 114 has a plurality of wedge cams 1141 arranged on the two end surfaces circumferentially and radially. The inclination angle 1142 of the wedge cams 1141 of the wedge cam surfaces 114 of the body 11 is greater than the lead angle 53 of the bolt 5.

Referring to FIG. 1, FIG. 2A, FIG. 2B, FIG. 6, FIG. 7, FIG. 8, FIG. 9, FIG. 10 and FIG. 11, the clamping force sensing washer 1 operates in conjunction with the loosening-proof washers 4 disposed on the two end surfaces of the body 11, respectively, such that the wedge cam surfaces 41 of the loosening-proof washer 4 and the wedge cam surfaces 114 of the body 11 mesh with each other to effect loosening-proofing. The body 11 is made of metal. The hardness of the body 11 is equal to the hardness of the loosening-proof washer 4 (variations in the hardness fall within an allowed range). The hardness of the body 11 is greater than the hardness of the bolt head 51 of the bolt 5 and the hardness of the fixed element 7.

Referring to FIG. 1, FIG. 2A, FIG. 2B, FIG. 6, FIG. 7, FIG. 8, FIG. 9, FIG. 10 and FIG. 11, in this embodiment, a plurality of wedge cams 411 corresponding in dimensions and structure to the wedge cam surfaces 114 of the body 11 are arranged circumferentially and radially on the wedge cam surfaces 41 of the loosening-proof washer 4 operating in conjunction with the body 11. The other surface of the loosening-proof washer 4 is the serrated rib surface 42 which has a plurality of serrated ribs 421 arranged circumferentially and radially and facing the end surface of the fixed element 7. When the bolt 5 is tightened, the serrated ribs 421 mesh with the surface of the fixed element 7.

Referring to FIG. 2A, FIG. 6, FIG. 7, FIG. 8 and FIG. 14, in this embodiment, the bolt 5 is right-hand threaded, whereas the inclination direction of the inclination angle 1142 of the wedge cam 1141 of the body 11 and the inclination angle 412 of the wedge cam 411 of the loosening-proof washer 4 is identical to the helical direction of the bolt 5. The inclination angle 422 of the serrated ribs 421 of the serrated rib surfaces 42 of the loosening-proof washer 4 is equal in magnitude to but opposite in inclination direction to the inclination angle 412 of the wedge cam 41 of the loosening-proof washer 4.

Referring to FIG. 1, FIG. 2A, FIG. 2B, FIG. 12, FIG. 13, FIG. 14, FIG. 15, FIG. 16 and FIG. 17, in this embodiment, the loosening-proof structures on the two end surfaces (perpendicular to the axial hole 111) of the body 11 are provided in the form of a combination of the aforesaid two aspects. The end surface of the body 11 faces the bottom of the bolt head 51 of the bolt 5 and is the radial rib surface 113. When the bolt 5 is tightened, the radial ribs 1131 are directly embedded in the bottom of the bolt head 51, without using the loosening-proof washer 4. The end surface facing the fixed element 7 is the wedge cam surface 114 which has a plurality of wedge cams 1141. The wedge cams 1141 are circumferentially and radially arranged on the end surface of the body 11, and their inclination angle 1142 is greater than the lead angle 53 of the bolt 5.

Referring to FIG. 1, FIG. 2A, FIG. 2B, FIG. 12, FIG. 13, FIG. 14, FIG. 15, FIG. 16 and FIG. 17, in this embodiment, the end surface of the body 11 faces the fixed element 7 and is a wedge cam surface 114 operating in conjunction with one of the two loosening-proof washers 4, such that the wedge cam surfaces 41 of the loosening-proof washer 4 and the wedge cam surfaces 114 of the body 11 mesh with each other to effect loosening-proofing. The serrated ribs 421 of the serrated rib surfaces 42 on the rear surfaces of the wedge cam surfaces 41 of the loosening-proof washer 4 are embedded in the surface of the fixed element 7. The inclination angle 422 of the serrated ribs 421 is greater than the lead angle 53 of the bolt 5. The inclination direction of cross sections of the serrated ribs 421 is opposite to the helical direction of the bolt 5. Its principle is the same as the foregoing.

Figure 18:
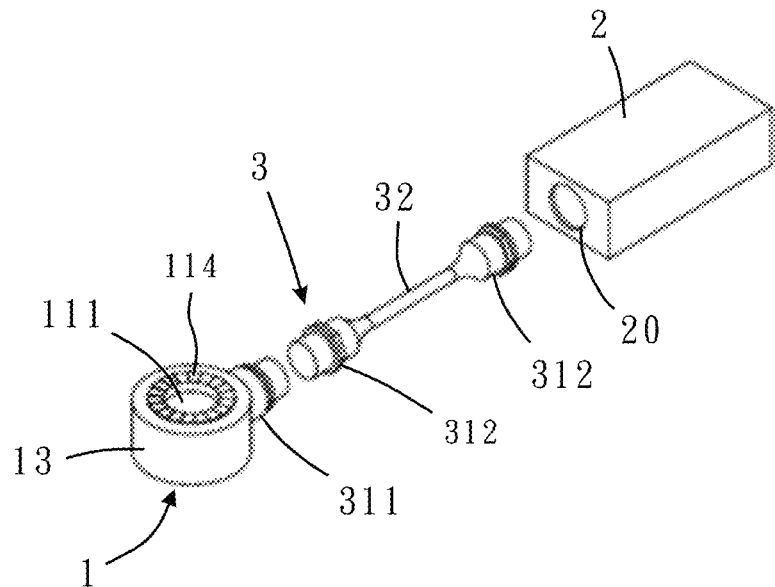
FIG. 18 is a schematic view of the bolt clamping force sensing washer according to an embodiment of the present disclosure.
Figure 19:
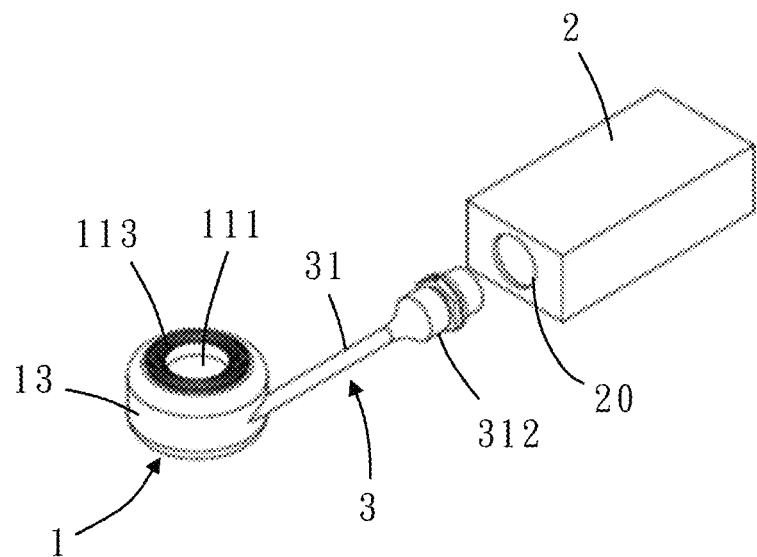
FIG. 19 is another schematic view of the bolt clamping force sensing washer according to an embodiment of the present disclosure.

Referring to FIG. 4, FIG. 7, FIG. 10, FIG. 13, FIG. 16, FIG. 18 and FIG. 19, in an embodiment, the connection line assembly 3 comprises a connector 311 and a dual-connector connection line 32 which are coupled together or is a single-connector connection line 31, wherein a sensing signal line 121 (shown in FIG. 4) of the sensing component 12 is electrically connected to the connector 311. As shown in FIG. 18, the sensing component 12 is electrically connected to a connector 20 of the signal processor 2 through a connector 312 of a dual-connector connection line 32 and a connector 311 on the bushing 13. Alternatively, as shown in FIG. 19, the single-connector connection line 31 is electrically connected to the sensing signal line 121, and the single-connector connection line 31 penetrates the bushing 13 in order to be electrically connected to the connector 20 of the signal processor 2.

Referring to FIG. 4, FIG. 7, FIG. 10, FIG. 13, and FIG. 16, in an embodiment, the sensing component 12 is a resistive strain gauge or pressure sensing component (for example, piezo) for measuring the deformation signal generated by the axial load applied to the body 11.

Figure 20:
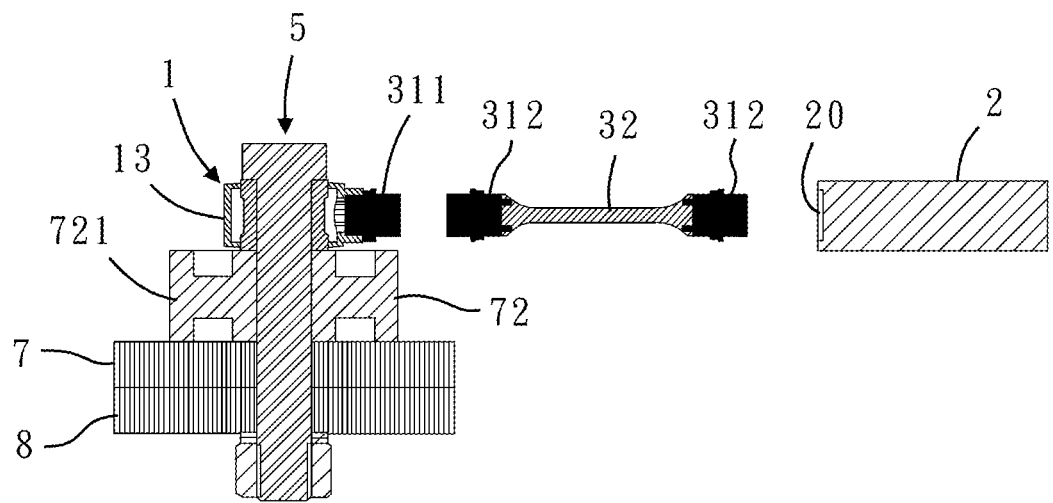
FIG. 20 is a schematic view of calibration of the bolt clamping force sensing washer according to an embodiment of the present disclosure.
Figure 21:
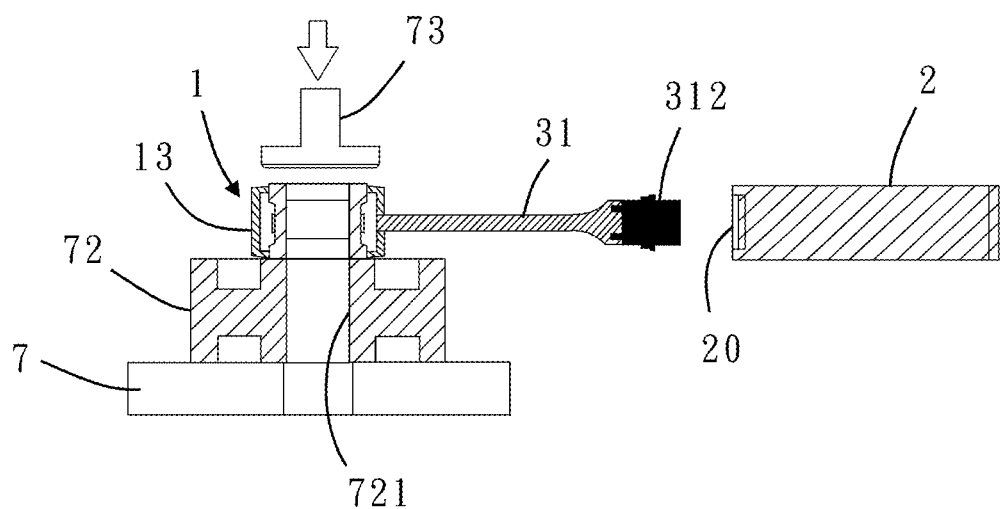
FIG. 21 is another schematic view of calibration of the bolt clamping force sensing washer according to an embodiment of the present disclosure.

Referring to FIG. 20 and FIG. 21, in an embodiment, the signal processor 2 and the sensing washer 1 are paired and electrically connected to each other. After the sensing washer 1 has been calibrated, the memory unit 26 of the signal processor 2 stores a relation curve of the deformation signal of the body 11 and the corresponding axial clamping force. Each sensing washer 1 and the signal processor 2 electrically connected thereto match. As shown in FIG. 20, calibration of the bolt clamping force sensing washer of the present disclosure entails fastening the bolt 5, the sensing washer 1, a master compression load cell 72, the fixed element 7 and the fastened element 8 to the sensing washer 1 and the master compression load cell 72 to the designed extent, then passing the bolt 5 through the axial hole 111 of the sensing washer 1, a through hole 721 of the master compression load cell 72, and the through hole 71 of the fixed element 7 so as for the bolt 5 to be fastened within the screw tapped hole 81 of the fastened element 8, and applying a torque to generate an axial load for figuring out the deformation signal of the sensing washer 1 and the axial load of the master compression load cell 72, so as to create a curve of relation between the clamping force and the deformation signal of the sensing washer 1 and store the curve in a peripheral memory device or the memory unit 26 of the signal processor 2 electrically connected to the sensing washer 1 together with the serial number of the sensing washer 1 and related calibration parameters. As shown in FIG. 21, calibration of the bolt clamping force sensing washer of the present disclosure is attained as follows: a force-applying workpiece 73 applies an axial force on the sensing washer 1 and the master compression load cell 72 capable of coaxial positioning and thereby presses the fixed element 7 downward to the designed capability range of the sensing washer 1 and the master compression load cell 72, so as to figure out the deformation signal of the sensing washer 1 and the axial load of the master compression load cell 72, create a curve of relation between the clamping force and the deformation signal of the sensing washer 1, and store the curve in a peripheral memory device or the memory unit 26 of the signal processor 2 electrically connected to the sensing washer 1 together with the serial number of the sensing washer 1 and related calibration parameters. The calibration of a plurality of said sensing washers 1 entails entering the serial numbers of the sensing washers 1 and calibration parameters into the memory unit 26 of the signal processor 2 for matching and recordation. The serial numbers of the sensing washer 1 and the calibration parameters can also be stored in a peripheral memory device or a cloud database so as to be downloaded to the signal processor 2 for computation as needed. Alternatively, the serial numbers of the sensing washer 1 and calibration parameters are embodied in a 1D or 2D barcode attached to the outer surface of the bushing 13 or connected to the connection signal line 31 of the bushing 13, such that a user can scan the barcode with a wired or wireless scanner and thereby enter the serial number of the sensing washer 1 and calibration parameters into the signal processor 2 for pro-matching computation Referring to FIG. 3, FIG. 6, FIG. 9, FIG. 12 and FIG. 15, in an embodiment, the power circuit unit 24 is rechargeable battery, electrical outlet or solar panel. When the remaining power level of the power circuit unit 24 decreases to its lowest limit, the microprocessor 21 instructs the alert unit 28 to send an alert to change or repair the power circuit unit 24.

Referring to FIG. 22, in an embodiment, the signal processor 2 checks, at predetermined time intervals, whether the tightness of the sensing washer 1 falls within a predetermined range and transmits data to an external device 6 (for example, the controller 91 or cloud server 92). Alternatively, the external device 6 (for example, the controller 91 or cloud server 92) is wiredly or wirelessly electrically connected to the memory unit 26 of the signal processor 2 to check whether the tightness of the sensing washer 1 falls within a predetermined range. As described before, the process of clamping the bolt 5 entails passing the bolt 5 through the axial hole 111 of the body 11, the through hole 71 of the fixed element 7, and the screw tapped hole 81 of the fastened element 8 to clamp the fixed element 7 and the fastened element 8. During the process, the signal transmission unit 25 of the signal processor 2 keeps receiving the deformation signal from the sensing washer 1, such that the microprocessor 21 of the signal processor 2 performs computation continuously to figure out variations in the clamping force and synchronously transmits the variations wiredly (for example, by RS485) or wirelessly (for example, by RF antenna) to the controller 91 (shown in FIG. 22) in an electrically-driven impact torque tool or the controller 91 (shown in FIG. 22) connected to a pneumatic impact wrench. The controller 91 is pneumatically-driven, electrically-driven or hydraulically-driven. As soon as the bolt 5 attains the target level of the clamping force predetermined by the controller 91, the controller 91 cuts off power supply and informs workers with sound or lamp signs. After the bolt 5 has been tightened, the radial ribs 1131 (shown in FIG. 1 and FIG. 4) of the radial rib surfaces 113 on the two end surfaces of the sensing washer 1 are embedded in the bottom of the bolt head 51 of the bolt 5 and in the surface of the fixed element 7, respectively, such that the loosening-proof structures on the two end surfaces of the sensing washer 1 prevent the vibration-induced loosening of the bolt 5. As shown in FIG. 22, the sensing washer 1 performs remote monitoring and control through the signal processor 2, the gateway 29 electrically connected thereto, and a peripheral monitoring device (such as the cloud server 92). The gateway 29 is equipped with a positioning device (such as GPS) or lightning protection device for outdoor use as needed, thereby allowing the position of the bolt 5 and the state of the clamping force to be transmitted, according to a predetermined parameter, to the cloud server 92 for remote monitoring and control. As soon as variation in the clamping force of the bolt 5 falls outside a predetermined range, the alert unit 28 of the signal processor 2 or the controller 91 sends an alert. A plurality of said signal processors 2 are electrically connected to one gateway 29 and then to a peripheral, such as the controller 91 or the cloud server 92. Access to the signal processor 2 and access to the sensing washer 1 are independent of each other; however, a calibration-related parameter component, for example, RF label, 1D or 2D barcode, or delivery serial number of the sensing washer 1, adapted to recognize or read the sensing washer 1 is attached to an appropriate point on the bushing 13 or the end surface of the body 11 of the sensing washer 1; consequently, when the sensing washer 1 is electrically connected to the signal processor 2, the calibration parameter of the sensing washer 1 is obtained and used in computing the clamping force level and performing a related process, for example, memory, transmission, and monitoring. Therefore, the bolt clamping force sensing washer of the present disclosure evaluates the variations in the clamping force generated in the course of tightening the bolt 5, monitors the tightness of the bolted joint continuously, prevents vibration-induced loosening, and gives alerts in the event of tampering, so as to ensure everlasting structural safety. Furthermore, operation-related data stored in the memory unit 26 of the signal processor 2 enables the tracking and checking of related responsibilities.

While the present disclosure has been described by means of specific embodiments, numerous modifications and variations could be made thereto by those skilled in the art without departing from the scope and spirit of the present disclosure set forth in the claims.

What is claimed is:

1. A bolt clamping force sensing washer, comprising:
   a sensing washer having a body, a sensing component, and a bushing, the body being made of metal and having an axial hole, the axial hole matching an outer diameter of the thread of a bolt and being coaxial with the body, wherein two end surfaces of the body are perpendicular to the axial hole and each have a loosening-proof structure, wherein a circumferential surface of the body has a concave circumferential groove for receiving the sensing component adapted to measure a deformation signal generated by the body under an axial load, wherein the bushing is made of metal or plastic or formed by plastic insulating material casting to enclose the sensing component;
   a signal processor having a signal amplifier, a microprocessor, a pairing switch, a power circuit unit, a signal transmission unit, a memory unit, an RF antenna and an alert unit; and
   a connection line assembly disposed at the bushing to electrically connect the sensing component and the signal processor.

2. The bolt clamping force sensing washer of claim 1, wherein the loosening-proof structures on the two end surfaces of the body are two radial rib surfaces, two wedge cam surfaces, or one said radial rib surface and one said wedge cam surface.

3. The bolt clamping force sensing washer of claim 2, wherein the loosening-proof structures on the two end surfaces of the body are radial rib surfaces, wherein gradient of arcuate cross sections of the radial rib is greater than the lead angle of the bolt and irrelevant to helical direction of the bolt.

4. The bolt clamping force sensing washer of claim 2, wherein the loosening-proof structures on the two end surfaces of the body are wedge cam surfaces, wherein inclination angle of the wedge cams on the wedge cam surfaces is greater than the lead angle of the bolt, and inclination direction of the wedge cams is identical to helical direction of the bolt.

5. The bolt clamping force sensing washer of claim 4, wherein the loosening-proof structures on the two end surfaces of the body are wedge cam surfaces meshing with wedge cam surfaces of the loosening-proof washer.

6. The bolt clamping force sensing washer of claim 5, wherein inclination angle of cross sections of serrated ribs on serrated rib surfaces on rear surfaces of the wedge cam surfaces of the loosening-proof washer is greater than the lead angle of the bolt, and inclination direction of cross sections of the serrated ribs is opposite to the helical direction of the bolt.

7. The bolt clamping force sensing washer of claim 5, wherein the body is of the same hardness as the loosening-proof washer, wherein the body and the loosening-proof washer are of higher hardness than a bolt head of the bolt and the surface of a fixed element.

8. The bolt clamping force sensing washer of claim 6, wherein the body is of the same hardness as the loosening-proof washer, wherein the body and the loosening-proof washer are of higher hardness than a bolt head of the bolt and the surface of a fixed element.

9. The bolt clamping force sensing washer of claim 1, wherein the sensing component is a resistive strain gauge or pressure sensing component for measuring the deformation signal generated under the axial load.

10. The bolt clamping force sensing washer of claim 1, wherein the signal processor transmits the deformation signal to a controller of a torque tool wirelessly to control the clamping force of the bolt and uploads the deformation signal to a monitoring device through a gateway wiredly or wirelessly, wherein the monitoring device sends an alert when the deformation signal exceeds a predetermined level.

* * * * *